United States Patent [19]
Matsubara et al.

[11] 3,993,841
[45] Nov. 23, 1976

[54] STEEL PLATE COATED WITH THERMOSETTING PHENOL RESIN AND BISPHENOL A TYPE EPOXY RESIN

[75] Inventors: Takashi Matsubara; Yûkô Takeuchi; Toshiro Hirose, all of Nagoya, Japan

[73] Assignee: Toagosei Chemical Industry Co., Ltd., Tokyo, Japan

[22] Filed: Feb. 10, 1975

[21] Appl. No.: 548,840

[30] Foreign Application Priority Data
  Feb. 8, 1974  Japan.............................. 49-15364
  Feb. 8, 1974  Japan.............................. 49-15365

[52] U.S. Cl............................... 428/418; 260/831; 428/416; 428/460; 428/474; 426/131
[51] Int. Cl.²...................... B32B 15/08; B32B 15/18
[58] Field of Search ........... 428/418, 460, 416, 474; 260/831

[56]  References Cited
  UNITED STATES PATENTS

| | | | |
|---|---|---|---|
| 3,216,848 | 11/1965 | Hart et al. | 428/460 X |
| 3,663,354 | 5/1972 | Ueno et al. | 260/831 X |
| 3,871,896 | 3/1975 | Matsudaira et al. | 260/831 X |
| 3,932,144 | 1/1976 | Matsubara et al. | 29/195 |
| 3,936,342 | 2/1976 | Matsubara et al. | 156/330 |

OTHER PUBLICATIONS

Derwent Abstract of Jap. Patent No. 72/38056, Pub. Sept. 26, 1972, Toyoseikan Co.

*Primary Examiner*—P. C. Ives
*Attorney, Agent, or Firm*—Sughrue, Rothwell, Mion, Zinn & Macpeak

[57] ABSTRACT

A coated steel plate suitable for bonding with a polyamide adhesive comprising a steel plate having coated thereon (a) a composition comprising a thermosetting phenol resin and a bisphenol A type epoxy resin, the thermosetting phenol resin comprising the condensation product obtained on reacting under refluxing a phenol and formaldehyde in less than one mol per equivalent of the phenolic hydroxyl group in the presence of an alkali catalyst; (b) a composition comprising a thermosetting phenol resin and a bisphenol A type epoxy resin, the thermosetting phenol resin comprising the condensation product obtained by washing with water the condensation product obtained by reacting under refluxing a phenol and formaldehyde in less than one mol per equivalent of the phenolic hydroxyl group in the presence of an alkali catalyst and then heating the condensation product to temperatures above about 60° C; (c) a composition comprising a thermosetting phenol resin and a bisphenol A type epoxy resin, the thermosetting phenol resin comprising the condensation product obtained by washing with water a condensation product obtained by reacting a phenol and formaldehyde in an amount more than about one mol per equivalent of the phenolic hydroxyl group under refluxing in the presence of an alkali catalyst and, then, further heating the condensation product to a temperature higher than about 60° C with the addition of a phenol in an amount such that the total amount of the phenolic hydroxyl group is greater than one equivalent per mol of formaldehyde; or (d) mixtures thereof.

11 Claims, No Drawings

STEEL PLATE COATED WITH THERMOSETTING PHENOL RESIN AND BISPHENOL A TYPE EPOXY RESIN

BACKGROUND OF THE INVENTION

1. Field of the Invention

The present invention relates to a coated steel plate suitable for bonding with a polyamide adhesive prepared by coating on a steel plate, such as a chromated steel plate, a galvanized steel plate, a tin plate, an untreated cold rolled steel plate, a nickel plated steel plate, a vapor aluminum deposited coated steel plate, a chromium thin layer plated steel plate, etc., with a composition comprising a thermosetting phenol resin as described hereinafter and a bisphenol A type epoxy resin.

2. Description of the Prior Art

Hitherto, as materials for metallic containers such as cans for foods and also various kinds of cans, a so-called tin plate, that is a tinned steel plate has been mainly used. The feature of the material is that it can be easily soldered but, on the other hand, the material has disadvantages in that the material lacks printability and the ability to protect the contents in the cans as well as toxicity hazards can occur with the material.

Recently, however, a chromated steel plate and aluminum have been used as materials for tin plate and further the use of an untreated steel plate which has not been subjected to plating or other chemical treatments has recently been investigated.

Processes for producing such a chromated steel plate are a process in which a steel plate is electrolyzed in a bath comprising an aqueous solution of $CrO_3$ having a comparatively low concentration of less than 100 g/liter having added thereto phenoldisulfonic acid, catecholdisulfonic acid, or a salt of these acids or a small amount of sulfuric acid and a fluoride at an appropriate current density and a process in which a steel plate is electrolytically chromated in an aqueous solution of $CrO_3$ having a high concentration of higher than 100 g/liter and, after washing the plate with water, the plate is further electrolyzed in an aqueous $CrO_3$ solution having a low concentration. "Hi-Top" and "Supercoat", trade names made by Toyo Kohan Co., Ltd., are commercially available examples of chromated steel plates produced by the former process and "Cansuper", trade name made by Nippon Steel Corporation, and "Weirchrome", trade name made by National Steel Co., are commercially available examples of chromated steel plates produced by the latter process. Each of these chromated steel plates has a quite thin metallic chromium layer and hydrated chromium oxide layer and the thickness of the layer is usually about 0.05 to 2 mg (as Cr)/$dm^2$. Another commercially available example of a chromated steel plate is "Hi Nack", trade name made by Nippon Kokan K.K., which is produced by immersing a steel plate in an aqueous solution containing $CrO_3$ and a reducing agent and, after removal, drying the steel plate by heating to form a coating consisting of hydrated chromium oxide only.

A galvanized steel plate is usually produced by immersing in a molten zinc bath a steel plate which has been cleaned by pickling with sulfuric acid or hydrochloric acid and a tin plate is produced by immersing a pickled steel plate in a molten tin bath or is recently produced by electroplating a steel plate in a bath mainly containing, for example, 76 g of stannous chloride, 25 g of sodium fluoride, 50 g of potassium fluoride, and 45 g of sodium chloride per liter of the bath.

A chromated steel plate has the advantage that it has superior printability as mentioned before but since it has the disadvantage that soldering is not applicable, welding or an adhesive is employed in bonding the plates.

Also, although aluminum is used in some fields due to the rustless property, beautiful appearance, and light weight, the use of aluminum is limited to specific fields due to the high cost of aluminum.

On the other hand, in regard to tin plate, as a result of apprehesion on exhaustion of tin resources, the thickness of the plating tends to be reduced greatly, which tends to make the application of soldering difficult.

An untreated cold rolled steel plate may be lowest in cost but since an untreated cold rolled steel plate rusts readily, sufficient rust proofing is not obtained with an ordinary under coat, and further since sufficient bonding strength is not obtained, an untreated cold rolled steel plate has not been used widely at present.

Many publications on bonding of steel plates with adhesives exist but the results shown are all insufficient in bonding rate, bonding strength, evenness of bonding strength, water proofing property, and heat resistance.

For example, the bonding rate for soldering steel plate in manufacturing metallic cans is about 400 cans/min but in using adhesives the bonding rate must be about 600 to 800 cans/min, the heating and pressing period of time must be about 2 to 3 seconds, and the bonding must be finished in a maximum of about 10 seconds.

Also, polyamide provides excellent adhesives for structural purposes together with a thermosetting resin such as an epoxy resin, a phenol resin, etc., but use of such adhesives is not desirable since three-dimensional hardening is required at bonding and hence a long period of time is required to finish the bonding. For example, the period of time required for hardening such adhesives at bonding is from a few minutes to several tens of minutes at temperatures of about 150° to 250° C, and thus such a bonding rate is unsatisfactory.

On the other hand, in the case of producing cans for food, the cans must retain sufficient bonding strength at temperatures encountered in sterilizing the cans with steam and further the cans are sometimes stored at temperatures from about −20° to about −30° C. In other words, the cans must retain strong bonding strength not only at room temperature (about 20°–30° C) but also over a considerably wide temperature range.

SUMMARY OF THE INVENTION

An object of this invention is, as clear from the above explanations, to provide a coated steel plate such as a coated chromated steel plate and a coated untreated steel plate which has a quite high bonding rate of less than about 10 seconds, particularly less than about 2 to 3 seconds in the case of bonding the steel plates using polyamide adhesives and provides a sufficient bonding strength over a wide temperature range of from about −30° to 130° C, suitable for manufacturing cans which can be sterilized with steam.

That is, the present invention provides a coated steel plate suitable for bonding with polyamide adhesives prepared by coating on a steel plate (a) a composition comprising a thermosetting phenol resin and a bisphenol A type epoxy resin, the thermosetting phenol resin comprising the condensation product obtained on reacting under refluxing a phenol and formaldehyde in less than one mol per equivalent of the phenolic hydroxyl group in the presence of an alkali catalyst; (b) a composition comprising a thermosetting phenol resin and a bisphenol A type epoxy resin, the thermosetting phenol resin comprising the condensation produced obtained by washing with water the condensation product obtaining by reacting under refluxing a phenol and formaldehyde in less than one mol per equivalent of the phenolic hydroxyl group in the presence of an alkali catalyst and then heating the condensation product to temperatures above about 60° C (c) a composition comprising a thermosetting phenol resin and a bisphenol A type epoxy resin, the thermosetting phenol resin comprising the condensation product obtained by reacting a phenol and formaldehyde in an amount more than about one mol per equivalent of the phenolic hydroxyl group under refluxing in the presence of an alkali catalyst, washing the condensation product with water, and then heating the condensation product to temperatures above about 60° C with the addition of a phenol in an amount such that the total phenolic hydroxyl group content is greater than one equivalent per mol of formaldehyde, or (d) mixtures thereof.

DETAILED DESCRIPTION OF THE INVENTION

A feature of this invention is that the bonding can be finished in a short period of time by using the above-described coated steel plate of this invention. The bonded steel plate of this invention maintains its high bonding strength over a wide temperature range, in particular under sterilization conditions in a water-saturated retort (about 120° C), and further the coating composition used in this inventin can be hardened at a quite high rate as compared with the use of a conventional thermosetting coating composition comprising a phenol resin and an epoxy resin.

For example, the coating conditions for conventional phenol-epoxy coating compositions are about 10 to 30 minutes at about 200° to 210° C but the coating condition for the coating composition of this invention ranges from about 30 seconds to 10 minutes at about 180° to 300° C, preferably 1 to 5 minutes at 180° to 260° C. As the phenol used in the compositions of this invention, phenol and a mixture of phenol and o-cresol, m-cresol, p-cresol, or bisphenol A are suitable.

For preparing the thermosetting phenol resin of Compositions (a) and (b) used in this invention, the ratio of the phenol and the formaldehyde must be less than one mol of formaldehyde per equivalent of the phenolic hydroxyl group.

The thermosetting phenol resin of Composition (a) can be obtained by reacting under refluxing a phenol and an aqueous formaldehyde solution in less than one mol, e.g., about 0.5 mol to less than one mol, per equivalent of the phenolic hydroxyl group in the presence of an alkali catalyst such as sodium hydroxide, potassium hydroxide, calcium hydroxide, ammonia, hexamethylenetetramide, trimethylamine, triethylamine, pyridine, etc. Preferred alkali catalysts are ammonia, hexamethylenetetramine and mixtures thereof. A suitable amount of the alkali catalyst which can be used generally ranges from about 0.2 to 5% by weight, preferably 0.5 to 3% by weight, bases on the total weight of the reactants employed. The thermosetting phenol resin of Composition (b) can be obtained by washing the condensation product obtained by reacting under refluxing a phenol and formaldehyde in less than one mol per one equivalent of the phenolic hydroxyl group in the presence of an alkali catalyst as described above with water and then heating the condensation product to a temperature above about 60° C. The upper limit of the temperature of heating is restricted only by practical and economic considerations, and generally the upper limit is about 150° C.

The thermosetting phenol resin of Composition (c) can be obtained by condensing a phenol and an aqueous formaldehyde solution using formaldehyde in an amount above about one mol per equivalent of phenolic hydroxyl group in the presence of an alkali catalyst and heating the condensation product, after washing the condensation product with water, to temperatures above about 60° C with the addition of a phenol so that the total amount of the phenolic hydroxyl group is greater than one equivalent per mol of formaldehyde. In preparing the thermosetting phenol resin of Composition (c), the composition of the phenol component used in the condensation reaction can be same as or different from the composition of the phenol component used in the post heating step.

The use of the thermosetting phenol resin in this invention provides a quite high economical advantage because a feature of this invention is obtained without using a large amount of expensive phenols as compared with the techniques as described in Japanese Patent Publication No. 38,056/'72. The thermosetting phenol resin used in this invention can be modified using a small amount of other phenols for example, monohydric phenols and polyhydric phenols, such as cresol, xylenol, alkylphenol (e.g., p-tert.butylphenol, p-tert.amyl phenol, etc.), resorcin, naphthol, bisphenol A, etc. These other phenols are generally used in an amount of less than 20% by weight of the total weight of the phenolic components. A particularly preferable composition for the thermosetting resin used in this invention is a mixed system of phenol and o-cresol and further it is particularly desirable that the weight ratio of phenol to o-cresol in the thermosetting phenol resin ranges from about 40:60 to 95:5.

The washing of the condensation product, the thermosetting phenol resin, for Composition (b) is carried out by stirring the condensation product together with water in an amount more than about 0.3 times up to about 100 times, preferably 1 to 20 times, the weight of the condensation product at a temperature higher than room temperature (about 20°–30° C), removing the aqueous layer formed, and repeating more than twice the above described procedure and thus the unreacted formaldehyde, the catalyst, etc., are removed from the condensation product. Then, the condensation product thus washed is heated for more than about 0.5 hour at a temperature higher than about 60° C. The upper limit of the temperature of heating is restricted only by practical and economic considerations, and generally the upper limit is about 150° C. A preferred time and temperature is about 0.5 to 20 hours at 90° to 130° C. By the heat treatment, the soft condensation product becomes a crushable product but in this case excessive heating should be avoided since excessive heating causes gelation. The heat treatment can also be carried out in the presence of an appropriate solvent, e.g., an alphatic alcohol such as butanol and an aromatic hydrocarbon such as benzene, toluent, xylene, etc.

The thermosetting phenol resin of Composition (c) as described above can be obtained by reacting a phenol and an aqueous formaldehyde solution in such a ratio that the proportion of formaldehyde is greater than about one mol per equivalent of the phenolic hydroxyl group under refluxing using an ordinary alkali catalyst as described hereinbefore, such as sodium hydroxide, potassium hydroxide, ammonia, hexamethylenetetramine, and trimethylamine, and in the amount hereinbefore described and heating the condensation product thus formed, after washing the product with water, to temperatures above about 60° C with the addition of a phenol in such an amount that the total amount of the phenol is greater than one equivalent of the phenolic hydroxyl group per mol of formaldehyde. A suitable amount of the formaldehyde can range up to about 2 mol per equvalent of the phenolic hydroxyl group in the condensation and a suitable amount of the phenol added in the post heating is up to about 2 equivalents per mol of formaldehyde. The upper limit of the temperature of heating is restricted only by practical and economic considerations, and generally the upper limit is about 150° C. Preferred alkali catalysts are ammonia, hexamethylenetetramine and mixtures thereof.

By using an excess amount of formaldehyde to the amount of the phenol in the condensation reaction to produce the thermosetting phenol resin of Composition (c), the yield for the expensive phenol can be increased. The washing of the condensation product, the thermosetting phenol resin of Composition (c), is carried out as described above for the thermosetting phenol resin of Composition (b) by stirring the condensation product with water in an amount of about 0.3 times to 100 times, preferably 1 to 20 times, larger than the weight of the condensation product at temperatures higher than room temperature, then removing the aqueous layer formed, and repeating these procedures more than twice. Thus, the unreacted formaldehyde and the catalyst can be removed from the condensation product. Then, after adding a phenol in the above-described amount to the washed condensation product, the mixture is heated to temperatures above about 60° C sufficiently for longer than about 0.5 hour, preferably for 0.5 to 20 hours at 90° to 130° C to produce the thermosetting phenol resin of Composition (c). By this heating, the mixture of the condensation product and the phenol is converted into a crushable resin but excessive heating must be avoided since excessive heating may cause gelation.

The resin thus obtained is a resole type mixed phenolic resin having a mean molecular weight of 220 to 350, which is mainly composed of phenol and/or cresol nuclei, combined through a methylene bond or a methyleneoxy bond and having a lower proportion of terminal methylol groups than an ordinary resole type phenolic resin. The properties of the phenol resin per se obtained according to each of the methods as described above are as follows:

Phenol Resin of Composition (a):
  Liquid (at room temperature)
  Specific Gravity: 1.1–1.25
Phenol Resin of Composition (b):
  Softening Point: 60° – 100° C
  Specific Gravity: 1.2°–1.25°
Phenol Resin of Composition (c):
  Softening Point: room temp. — 60° C
  Specific Gravity: 1.1–1.25

Composition (b) has substantially the same properties as those of Composition (c). Composition (a) requires a slightly longer baking time when used as a coating to achieve a similar bonding strength as achieved with Compositions (b) and (c).

Also, the bisphenol A type epoxy resin used in this invention is a polycondensate obtained by reacting epichlorohydrin and 2,2-bis(4'-hydroxyphenyl)propane and has the following formula;

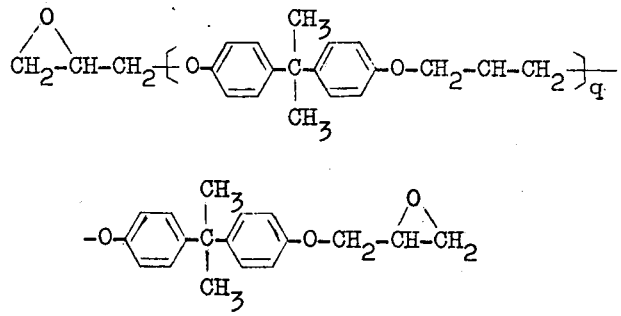

In the present invention the bisphenol A type epoxy resin is one having the general formula above where q is such that the resin has a mean molecular weight (the value calculated as an epoxy equivalent) of more than 800, preferably of about 2,000 to 4,000.

Examples of these epoxy resin preferably used in this invention are as follows: Epikote 1001 (epoxy equivalent: 450–500; hydroxyl group content: 0.29; and means molecular weight: 900), Epikote 1004 (epoxy equivalent: 900–1000; hydroxyl group content: 0.33; and means molecular weight: 1400), Epikote 1007 (epoxy equivalent: 1750–2150; hydroxyl group content: 0.36; means molecular weight: 2900), and Epikote 1009 (epoxy equivalent: 2400–3500; hydroxyl group content: 0.40; and means molecular weight: 3750), trade names, all made by Shell Oil Co. and Araldite 6097 (epoxy equivalent: 1750–2150) made by Ciba Ltd. The epoxy equivalent is the number of grams of the resin containing one gram equivalent of epoxy groups and the hydroxyl group content is number of OH groups in 100 grams of the resin.

When a bisphenol A type epoxy resin, an alicyclic epoxy resin, a tetraepoxy resin, etc., each having a mean molecular weight of less than about 800 is employed in this invention, sufficient strength is not obtained, while if the molecular weight of these resins is above about 5,000, the solvent solubility becomes poor, which makes the use of such a resin impractical.

A preferred mixing ratio of the thermosetting phenol resin and the bisphenol A type epoxy resin in Compositions (a), (b), (c) and (d) of this invention is about 0.1 to 2.5 parts by weight, preferably 1 to 2.5 parts by weight, of the bisphenol A type epoxy resin to 1 part by weight of the thermosetting phenol resin. If the proportion of the bisphenol A type epoxy resin is more than about 2.5 parts by weight per 1 part by weight of the thermosetting phenol resin, severe baking conditions are required and a longer period of time is required to finish the baking of the coating of the resin composition, while if the proportion of the bisphenol A type epoxy resin is less than about 0.1 part by weight, sufficient strength is not obtained.

The coating condition for coating the composition comprising the thermosetting phenol resin and the bisphenol A type epoxy resin on a steel plate ranges from about 30 seconds to 10 minutes at about 180° to 300° C, preferably 1 to 5 minutes at 180° to 260° C and, in particular, one of the excellent features of this invention is that satisfactory coating is obtained by baking at such low temperatures.

In the present invention, the thermosetting phenol resin and the bisphenol A type epoxy resin of Compositions (a), (b), (c) and (d) are dissolved in a ketone such as acetone, methyl ethyl ketone, methyl isobutyl ketone, cyclohexanone, isophorone, etc.; an aromatic hydrocarbon such as benzene, toluene, xylene, etc.; a Cellosolve such as methyl Cellosolve, ethyl Cellosolve, butyl Cellosolve, etc.; an ester such as methyl Cellosolve acetate, ethyl Cellosolve acetate, butyl Cellosolve acetate, butyl acetate, etc.; an alcohol such as diacetone alcohol, n-butanol, etc.; or a mixture of these solvents, the solution is coated on a steel plate, and after removing the solvent by drying, the coated layer can be baked. A suitable coating layer thickness is about 1 to 10 $\mu$, preferably 2 to 6 $\mu$, on a dry basis. A suitable solution concentration which is generally used ranges from about 20 to 40% by weight although this will vary depending on the blending ratios, the kind of solvent employed, the coating technique, etc.

As polyamide adhesives suitable for the coated steel plate of this invention, nylon 11 which is a condensation product of 11-aminoundecanoic acid, nylon 12 which is a ring-opened polymer of ω-lauryl lactame, nylon 610 which is obtained by the condensation of hexamethylenediamine and sebacic acid, and nylon 612 which is obtained by the condensation of hexamethylenediamine and dodecandioic acid, each having a comparatively long methylene group, preferably more than 6 methylene groups per acid amide bond, in the main chain, are preferred since they have low hygroscopicity and have good dimensional stability but as the case may be, various kinds of copolymerized nylons can be also used.

Also, a mixture of nylon and a phenol resin or an epoxy resin can be used but the composition of the mixture is limited from the standpoint of bonding rate.

The polyamides above described contain therein repeating units of the formula

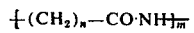

in which $n > 6$, for example, for the nylon 11, 12 and 13 series with $n$ being 10 for nylon 11, $n$ being 11 for nylon 12 and $n$ being 12 for nylon 13, and $m$ is the degree of polymerization; of the formula

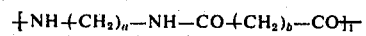

in which $(a+b)/2 > 6$, for example, for the nylon 610, 612 and 613 series with $a$ being 6 and $b$ being 8 for nylon 610, $a$ being 6 and $b$ being 10 for nylon 612 and $a$ being 6 and $b$ being 11 for nylon 613 and $l$ is the degree of polymerization; and for copolymerized nylons repeating units of the formula

in which $$\frac{o}{o+p} \times \left( \frac{c+d}{2} \right) + \frac{p}{o+p} \times e > 6$$

for example, nylon 612/12, $o/(o+p)$ being 0.1, $p/(o+p)$ being 0.9, $c$ being 6, $d$ being 10 and $e$ being 11, and $(o+p)/2$ is the degree of polymerization; and the formula

in which $$\frac{h}{h+j} \times f + \frac{j}{h+j} \times g > 6$$

for example, nylon 12/6, $h/(h+j)$ being 0.9, $j/(h+j)$ being 0.1, $f$ being 11 and $g$ being 5, and $(h+j)/2$ is the degree of polymerization.

At bonding, the resin composition preferably is coated on a chromated steel plate after degreasing the steel plate, e.g., with trichloroethylene.

The steel plate of this invention is applicable to various types of steel sheets as described below, but especially preferred results are obtained with chromated steel sheets.

Chromated steel sheets are produced using an electrolyzing process, in which the steel sheet is electrolyzed in a bath of a solution containing $CrO_3$ of a relatively low concentration of less than 100 g/l of $CrO_3$ and a small amount of phenol disulfonic acid, catechol-disulfonic acid or a salt thereof, $H_2SO_4$, or a fluorine compound such as sodium silicofluoride ($Na_2SiF_6$), or using another electrolyzing process in which the steel sheet is electrolyzed in a high concentration $CrO_3$ solution containing more than 100 g/l of $CrO_3$ to form a Cr plated layer. The plate is then washed with water, and electrolyzed in a low concentration $CrO_3$ solution. "Hi-top" and "Supercoat" (trade names produced by Toyo Kohan K.K.) are commercially available examples of chromated steel sheets produced according to the first electrolyzing process, and "Cansuper" (trade name, produced by Nippon Steel Corp.), and "Weirchrome" (trade name, produced by National Steel) are commercially available examples of chromated steel sheets produced according to the second electrolyzing process. All of these chromated steel sheets have an extremely thin metallic chromium layer and a hydrated chromate layer. The thickness of the metallic chromium layer is usually 0.05 to 2 mg/dm². Recently, a steel sheet having a thinner layer has been developed. Another chromated steel sheet commercially available as "Hinak" (trade name, produced by Nippon Kohan K.K.) is produced by dipping a steel sheet in an aqueous solution containing $CrO_3$ and a reducing agent, removing the steel sheet, and heating and drying the dipped sheet to form a single layer of hydrated chromate.

A zinc plated steel sheet is produced usually by dipping a steel sheet cleaned using sulfuric acid or hydrochloric acid in a molten zinc bath, and a tin plated steel sheet is produced by dipping a steel sheet in a molten tin bath or by electroplating the steel sheet in a bath of stannous chloride 76 g/l, sodium fluoride 25 g/l, potassium fluoride 50 g/l and sodium chloride 45 g/l.

All of the above described steel plates can be used in this invention.

The polyamide, usually in the form of a film or powder, is fully melted and applied to the steel sheets; for example, the nylon 12 is applied at 200° to 300° C, preferably 220° to 270° C, in 1 to 10 sec. A suitable temperature for applying the polyamide can range from about 20° C above the melting point of the polyamide to about 150° C above the melting point of the polyamide. A suitable thickness for the polyamide ranges from about 10 to 200 $\mu$, preferably 50 to 120 $\mu$.

The assembly of the steel sheets having thereon the cured primer composition and the polyamide adhesive can be suitably bonded in a short time using a pressure ranging from about 1 to 50 $Kg/cm^2$, preferably 2 to 15 $Kg/cm^2$.

Steel plates coated with the compositions of this invention provide superior properties to those achievable in the prior art. For example, U.S. Pat. No. 3,663,354 discloses a primer which is adhesive to both metals and linear polyamides which is a precondensate of (1) a resole type phenolic resin prepared from a mixture of phenols comprising p-cresol and at least one tri- or higher functional phenol and (2) and epoxy resin. Steel plate coated compositions of this invention can provide superior bonding strength at high temperature than that of U.S. Pat. No. 3,663,354. Accordingly, it can be expected that the compositions of this invention are applied not only to containers for beer or carbonated beverages, which do not require heat sterilization (i.e., in this field adhered cans are generally employed), but also to fields where sterilization at a high temperature is required. Secondly, high speed baking is possible to conduct on the coated steel plate of this invention. Thirdly, this invention is very economically advantageous since a larger amount of phenol, which is less expensive than the prior art composition employing cresol, can be used.

Further, U.S. patent application Ser. No. 442,557, filed Feb. 14, 1974, now U.S. Pat. No. 3,936,342, discloses a process for bonding steel plates with a polyamide adhesive by applying first a primer of 0.1 to 2.5 weight parts of a bisphenol A type epoxy resin having a mean molecular weight of more than about 800, and 1 weight part of a thermosetting phenolic resin, which is obtained by heating an aqueous solution of (a) phenol and orthocresol as a phenolic component and (b) formaldehyde as an aldehyde component, with the proportion by weight of the phenol to the orthocresol ranging from about 60:40 to 10:90, in the presence of a catalyst and reacting them with each other under refluxing conditions, on the surface of the steel sheets, and then bonding the steel sheets with a polyamide adhesive. The present invention coated steel plates can provide a better bonding-strength than the above-cited U.S. patent application. This is demonstrated by the results shown in the table below, where the same starting materials, i.e., o-cresol and phenol, are used and the same proportions are used to produce coated still plates of this invention and in accordance with those in the method of the above-cited U.S. patent application.

Comparative Test Data o-cresol : phenol = 30 : 70 (by wt);
phenol resin : epoxy resin = 6 : 4 (by wt)
Chromated steel plate: 0.24 mm; Nylon 11 adhesive

| T-Peel Strength (Kg/25 mm) | |
|---|---|
| U.S. Pat. No. 442,557 | This Invention |
| 49.1 Kg/25 mm phenolic OH/HCHO = 0.78 (mol) | 57 Kg/25 mm phenolic OH/HCHO = 1.2 (mol) |

The present invention can provide a better bonding strength over a wide temperature range, i.e., of from lower temperatures to higher temperature than that achieved in this prior U.S. patent application, the time required for baking is shorter, and this invention is more economical, as described above, since a smaller amount of o-cresol which is expensive can be used. Further this invention can provide an attractive gold-colored coating.

Now, the invention will be explained more specifically by reference to the following examples. Unless otherwise indicated herein, all parts, percents, ratios and the like are by weight.

EXAMPLE 1

In 67.5 g of a 37% aqueous formaldehyde solution were dissolved 85 g of phenol and 15 g of o-cresol and after adding to the solution 10 g of a 25% aqueous ammonia solution (0.8 mol of formaldehyde to one equivalent of the phenolic hydroxyl group), the mixture was reacted under refluxing in a reaction vessel equipped with a reflux condenser for 1 hour at 90° C. The resin layer formed was washed three times with 200 g of water at 20° C with stirring to remove unreacted formaldehyde and the catalyst and then dried for 2 hours at a temperature of lower than 50° C under a reduced pressure. Then by heating the yellow-brown soft condensed resin thus obtained to 95° C for 2 hours, an amber-colored cresol-modified phenol-formaldehyde resin (a thermosetting phenol resin) which could be crushed at room temperature was obtained.

Then, by dissolving 12 parts by weight of the resin thus obtained and 8 parts of a bisphenol A type epoxy resin, Epikote 1007 (mean molecular weight 2,900) in 80 parts by weight of methyl ethyl ketone, a solution having a resin concentration of 20% was obtained.

The above-described resin solution thus prepared was coated on steel plates (Cansuper; thickness: 0.24 mm) and untreated steel plates (thickness: 0.27 mm) and after drying in a dryer with an air stream at 60° C, the coated layers were baked for 5 minutes at 190° C to provide coated steel plates. The amount of the coated resin after baking was 50 $mg/100 cm^2$. Then, a dry film of nylon 11 having a thickness of 100 $\mu$ (Platilon E, made by Toagosei Chemical Industry Co., Ltd.) was placed between each pair of the coated steel plates and the resultant assembly was hot-pressed at 280° C for 3 seconds.

After allowing each set of the coated steel plates thus bonded to stand for one day, the T-peel strength was measured by means of a Schopper tensiometer at 20° C and at a peeling rate of 200 m/min. The T-peel strength values obtained were 51 kg/25 mm and 60 kg/25 mm.

EXAMPLE 2

Condensation products were prepared in the same manner as in Example 1 using 100 g of phenol and formaldehyde in various molar amounts per equivalent of phenolic hydroxyl group as shown in Table 1 and then by treating the condensation products under the conditions shown in Table 1, thermosetting phenol resins were produced. Each of the resins thus produced was coated on chromated steel plates and untreated steel plates as in Example 1, dried and baked to provide coated steel plates. Each pair of coated steel plates was bonded using nylon 11 as in Example 1 and the T-peel strength was measured. The results obtained are shown in Table 1.

Table 1

| Run No. | Mol No. * | Heating Conditions for Condensate Temperature (° C) | Time (hr) | T-peel strength (kg/25 mm) A | B |
|---|---|---|---|---|---|
| 1 | 1.05 | Not Heated | — | 15 | 22 |
| 2 | 0.9 | 95 | 4 | 40 | 48 |
| 3 | 0.8 | Not Heated | — | 30 | 35 |
| 4 | 0.8 | 95 | 2 | 39 | 49 |
| 5 | 0.8 | 95 | 4 | 42 | 51 |
| 6 | 0.8 | 80 | 12 | 39 | 47 |
| 7 | 0.6 | 95 | 4 | 41 | 49 |

* Number of mols of formaldehyde per mol of phenol
A: Chromated steel plate
B: Untreated steel plate Run No. 1 is a comparison example.

EXAMPLE 3

Condensed resins were prepared in the same manner as in Example 1 using 92 g of phenol and 8 g of o-cresol together with formaldehyde of the molar amounts shown in Table 2 and then by treating the resins under the conditions as shown in Table 2, thermosetting phenol resins were produced. Each of the resins thus produced was mixed with Epikote 1007 and the mixture was coated on chromated steel plates and untreated steel plates. Each pair of coated steel plates was bonded to each other using a film of nylon 11 as in Example 1 and the T-peel strength was measured. The results obtained are shown in Table 2.

Table 2

| Run No. | Mol No. * | Heating Conditions for Condensate Temperature (° C) | Time (hr) | T-peel Strength (kg/25 mm) A | B |
|---|---|---|---|---|---|
| 1 | 1.05 | Not Heated | — | 31 | 34 |
| 2 | 1.05 | 95 | 1 | 21 | 24 |
| 3 | 1.05 | 95 | 2 | 16 | 18 |
| 4 | 1.05 | 95 | 3 | 10 | 12 |
| 5 | 1.05 | 95 | 5 | ** | ** |
| 6 | 0.8 | Not Heated | — | 37 | 40 |
| 7 | 0.8 | 95 | 1 | 43 | 50 |
| 8 | 0.8 | 95 | 2 | 44 | 53 |
| 9 | 0.8 | 95 | 3 | 45 | 55 |
| 10 | 0.8 | 95 | 5 | 46 | 55 |

* Number of mols of formaldehyde per equivalent of phenolic hydroxyl group
** The phenol resin gelled making the formation of a primer composition difficult
A: Chromated steel plate
B: Untreated steel plate In addition, Run Nos. 1 to 5 are comparison examples and Run Nos. 6 to 10 are examples of this invention.

EXAMPLE 4

Condensed resins were prepared in the same manner as in Example 2 except that mixtures of phenol and other kinds of phenols having the mixing ratios shown in Table 3 and formaldehyde in the amounts as shown in Table 3 were employed. Then, by treating the condensed resins under the conditions shown in Table 3, thermosetting phenol resins were produced. Then, a mixture of each of the phenol resins thus produced and Epikote 1007 was coated on chromated steel plates and untreated steel plates, dried and baked as in Example 1.

Each pair of coated steel plates thus obtained was bonded to each other using nylon 11 and the T-peel strength was measured as in Example 1. The results obtained are also shown in Table 3.

Table 3

| Run No. | Phenols and Mixing Ratio (weight ratio) | Mol No. * | Heating Conditions for Condensate Temperature (° C) | Time (hr) | T-peel Strength (kg/25 mm) A | B |
|---|---|---|---|---|---|---|
| 1 | Phenol/m-Cresol/p-Cresol = 92/4/4 | 1.05 | Not Heated | — | 18 | 26 |
| 2 | '' | 1.05 | 95 | 2 | 16 | 20 |
| 3 | '' | 0.8 | Not Heated | — | 35 | 39 |
| 4 | '' | 0.8 | 95 | 2 | 41 | 48 |
| 5 | '' | 0.8 | 95 | 4 | 42 | 50 |
| 6 | Phenol/p-Cresol = 90/10 | 0.8 | 95 | 4 | 42 | 51 |
| 7 | Phenol/p-Cresol = 90/10 | 0.8 | 95 | 4 | 43 | 53 |
| 8 | Phenol/Bisphenol A = 90/10 | 0.8 | 95 | 4 | 39 | 49 |

* Number of mols of formaldehyde per equivalent of phenolic hydroxyl group
A: Chromated steel plate
B: Untreated steel plate In addition, Run Nos. 1 and 2 are comparison examples and Run Nos. 3 to 8 are examples of this invention.

EXAMPLE 5

In 92 g of a 37% aqueous formaldehyde solution (0.9 equivalent of phenolic hydroxyl group per mol of formaldehyde) were dissolved 70 g of phenol and 30 g of o-cresol and after adding to the solution 8 g of a 25% aqueous ammonia solution, the mixture was reacted for 1 hour at 90° C under refluxing. Thereafter, the resin layer obtained was washed three times with 200 g of water at 50° C with stirring to remove unreacted formaldehyde, the catalyst, etc., the product was dried for 2 hours under a reduced pressure at temperatures lower than 50° C, the yellow-brown viscous condensed resin thus obtained was mixed well with 82 g of phenol, and the mixture was heated to 95° C for 2 hours to provide an amber-colored o-cresol-modified phenol-formaldehyde resin (thermosetting phenol resin) which could be crushed at room temperature.

The weight ratio of phenol and o-cresol in the phenol resin was 83:17 and the equivalent number of phenolic hydroxyl groups per mol of formaldehyde was 1.67.

Then, 12 parts by weight of the resin thus obtained was dissolved in 80 parts by weight of methyl ethyl ketone together with 8 parts by weight of Epikote 1007 (means molecular weight 2900), as the bisphenol A type epoxy resin to form a resin solution having a resin concentration of 20%.

The above-described resin solution was coated on steel plates (Cansuper; thickness: 0.24 mm), and untreated steel plates (thickness: 0.27 mm) and after drying the plates at 60° C in a dryer with an air stream, the coated layers were baked for 5 minutes at 190° C to provide coated steel plates. The amount of the resin after baking was 50 mg/100 cm$^2$. Then, a dry film of nylon 11 having a thickness of 100 $\mu$ was placed between the coated steel plates thus obtained and the resultant assembly was hot-pressed for 3 seconds at 280° C to bond both plates.

Then, after allowing the bonded steel plates to stand for one day at room temperature, the T-peel strength was tested by means of a Schopper tensiometer at 20° C and at a peeling rate of 200 mm/min. The peel strength obtained was 47 kg/25 mm for Cansuper and 55 kg/25 mm for the untreated steel plate.

EXAMPLE 6

After dissolving 100 g of the phenol composition as shown in Table 4 in a 37% formaldehyde aqueous solution corresponding to 1.05 mols per equivalent of the phenolic hydroxyl group, 8 g of a 25% aqueous ammonia solution was added to the solution and the mixture was reacted for 1 hour at 90° C under refluxing. The resin layer formed was washed with 200 g of water at 20° C with stirring to remove unreacted formaldehyde, the catalyst, etc., and the product was dried for 2 hours at temperatures lower than 50° C under a reduced pressure to provide a colored viscous condensed resin. The product thus obtained was mixed well with the phenol in an amount so that the total amount of the phenolic hydroxyl group was greater than one equivalent per mol of formaldehyde and the mixture was heated under the conditions as shown in Table 4 to provide a thermosetting phenol resin which could be crushed at normal temperature. Then, 12 parts by weight of the resin thus obtained and 8 parts by weight of Epikote 1007 were dissolved in 80 parts by weight of methyl ethyl ketone to provide a solution having a resin concentration of 20%.

The solution was coated on Cansuper and an untreated steel plate, dried and baked to provide coated steel plates as in Example 5. The coated steel plates thus obtained were bonded to each other using a film of nylon 11 as in Example 5 and the T-peel strength was measured at 25° C. The results obtained are shown in Table 4.

Table 4

| Run No. | Phenol or Phenol Composition Used in Condensation Reaction (weight) | Phenols Added at Heating — Phenols | Phenols Added at Heating — Equivalent No. of Phenolic OH Group per Mol of Formaldehyde |
|---|---|---|---|
| 1 | Phenol | Phenol | 0.7 |
| 2 | " | m-Cresol | 0.7 |
| 3 | Phenol:o-Cresol = 92:8 | Phenol | 0.7 |
| 4 | " | " | 0.7 |
| 5 | " | " | 0.7 |
| 6 | " | " | 0.45 |
| 7 | " | " | 0.25 |
| 8 | " | Phenol:o-Cresol = 92:8 | 0.25 |
| 9 | " | o-Cresol | 0.25 |
| 10 | " | m-Cresol | 0.25 |
| 11 | Phenol:o-Cresol = 70:30 | Phenol | 0.7 |
| 12 | " | Phenol:o-Cresol = 70:30 | 0.7 |
| 13 | " | o-Cresol | 0.25 |
| 14 | Phenol:m-Cresol = 90:10 | Phenol | 0.7 |
| 15 | " | m-Cresol | 0.25 |
| 16 | Phenol:m-Cresol = 70:30 | Phenol | 0.7 |
| 17 | " | m-Cresol | 0.25 |
| 18 | Phenol:p-Cresol = 90:10 | Phenol | 0.7 |
| 19 | " | p-Cresol | 0.25 |
| 20 | Phenol:p-Cresol = 70:30 | Phenol | 0.7 |
| 21 | " | p-Cresol | 0.25 |
| 22 | Phenol:m-Cresol:p-Cresol = 90:5:5 | Phenol | 0.7 |

| Run No. | Total Equivalent No. of Phenolic OH Group per Mol of Formaldehyde | Heating Conditions Temperature (° C) | Heating Conditions Time (hr) | T-peel Strength (kg/25 mm) Chromated Steel Plate | T-peel Strength (kg/25 mm) Untreated Steel Plate |
|---|---|---|---|---|---|
| 1 | 1.65 | 95 | 5 | 36 | 43 |
| 2 | 1.65 | 95 | 5 | 41 | 46 |
| 3 | 1.65 | 95 | 2 | 44 | 53 |
| 4 | 1.65 | 95 | 5 | 52 | 60 |
| 5 | 1.65 | 80 | 15 | 48 | 52 |
| 6 | 1.4 | 95 | 5 | 46 | 51 |
| 7 | 1.2 | 95 | 5 | 42 | 46 |

-continued

| Run No. | Total Equivalent No. of Phenolic OH Group per Mol of Formaldehyde | Heating Conditions Temperature (° C) | Time (hr) | T-peel Strength (kg/25 mm) Chromated Steel Plate | Untreated Steel Plate |
|---|---|---|---|---|---|
| 8 | 1.2 | 95 | 5 | 49 | 53 |
| 9 | 1.2 | 95 | 5 | 56 | 61 |
| 10 | 1.2 | 95 | 5 | 50 | 56 |
| 11 | 1.65 | 95 | 5 | 50 | 55 |
| 12 | 1.65 | 95 | 5 | 57 | 63 |
| 13 | 1.2 | 95 | 5 | 55 | 60 |
| 14 | 1.65 | 95 | 5 | 41 | 46 |
| 15 | 1.2 | 95 | 5 | 43 | 47 |
| 16 | 1.65 | 95 | 5 | 44 | 48 |
| 17 | 1.2 | 95 | 5 | 45 | 48 |
| 18 | 1.65 | 95 | 5 | 44 | 49 |
| 19 | 1.2 | 95 | 5 | 49 | 53 |
| 20 | 1.65 | 95 | 5 | 51 | 57 |
| 21 | 1.2 | 95 | 5 | 53 | 59 |
| 22 | 1.65 | 95 | 5 | 43 | 52 |

While the invention has been described in detail and with reference to specific embodiments thereof, it will be apparent to one skilled in the art that various changes and modifications can be made therein without departing from the spirit and scope thereof.

What is claimed is:

1. A coated steel plate suitable for bonding with a polyamide adhesive comprising a steel plate having coated thereon
   a. a composition comprising a thermosetting phenol resin and a bisphenol A type epoxy resin, the thermosetting phenol resin comprising the condensation product obtained on reacting under reflexing a phenol and formaldehyde in less than one mol per equivalent of the phenolic hydroxyl group in the presence of an alkali catalyst;
   b. a composition comprising a thermosetting phenol resin and a bisphenol A type epoxy resin, the thermosetting phenol resin comprising the condensation product obtained by washing with water the condensation product obtained by reacting under refluxing a phenol and formaldehyde in less than one mol per equivalent of the phenolic hydroxyl group in the presence of an alkali catalyst and then heating the condensation product to a temperature above about 60° C;
   c. a composition comprising a thermosetting phenol resin and a bisphenol A type epoxy resin, the thermosetting phenol resin comprising the condensation product obtained by washing with water a condensation product obtained by reacting a phenol and formaldehyde in an amount more than about one mol per equivalent of the phenolic hydroxyl group under refluxing in the presence of an alkali catalyst and then heating the condensation product to a temperature higher than about 60° C with the addition of a phenol in an amount such that the total amount of the phenolic hydroxyl group is greater than one equivalent per mol of formaldehyde; or
   d. a mixture thereof.

2. The coated steel plate of claim 1, wherein said phenol is phenol or a mixture of phenol and o-cresol, m-cresol, or p-cresol.

3. The coated steel plate of claim 2, wherein said phenol is a mixture of phenol and o-cresol in a weight ratio of phenol to o-cresol ranging from about 40:60 to 95:5.

4. The coated steel plate of claim 1, wherein said alkali catalyst is sodium hydroxide, potassium hydroxide, calcium hydroxide, ammonia, hexamethylenetetramine, trimethylamine, triethylamine or pyridine.

5. The coated steel plate of claim 1, wherein said heating of the condensation product subsequent to said washing with water is at a temperature of 90° to 130° C for 0.5 to 20 hours.

6. The coated steel plate of claim 1, wherein said steel plate is a chromated steel plate.

7. The coated steel plate of claim 1, wherein said steel plate is a zinc plated steel plate.

8. The coated steel plate of claim 1, wherein said steel plate is an untreated rolled steel plate.

9. The coated steel plate of claim 1, wherein said bisphenol A type epoxy resin has a mean molecular weight of more than about 800.

10. The coated steel plate of claim 9, wherein said bisphenol a type epoxy resin has a means molecular weight of 2,000 to 4,000.

11. The coated steel plate of claim 1, wherein the weight of ratio of said thermosetting phenolic resin to said bisphenol A type epoxy resin is 1:1 to 2.5:1.

* * * * *